United States Patent
Nasser et al.

(10) Patent No.: US 11,391,855 B2
(45) Date of Patent: Jul. 19, 2022

(54) DEVELOPING A THREE-DIMENSIONAL QUALITY FACTOR MODEL OF A SUBTERRANEAN FORMATION BASED ON VERTICAL SEISMIC PROFILES

(71) Applicant: Saudi Arabian Oil Company, Dhahran (SA)

(72) Inventors: Husain Salman Nasser, Safwa (SA); Ali Ahmed Shaikh Sulaiman, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 185 days.

(21) Appl. No.: 16/818,575

(22) Filed: Mar. 13, 2020

(65) Prior Publication Data
US 2021/0286097 A1 Sep. 16, 2021

(51) Int. Cl.
*G01V 1/28* (2006.01)
*G01V 1/30* (2006.01)

(52) U.S. Cl.
CPC .............. *G01V 1/282* (2013.01); *G01V 1/302* (2013.01); *G01V 2210/161* (2013.01); *G01V 2210/642* (2013.01); *G01V 2210/643* (2013.01)

(58) Field of Classification Search
CPC .. G01V 1/282; G01V 1/302; G01V 2210/161; G01V 2210/642; G01V 2210/643
See application file for complete search history.

(56) References Cited

U.S. PATENT DOCUMENTS

| 6,516,275 B2 | 2/2003 | Lazaratos |
| 6,931,324 B2 | 8/2005 | Taner et al. |

(Continued)

FOREIGN PATENT DOCUMENTS

| CN | 100401101 C | * 7/2008 | ............... G01V 1/28 |
| CN | 107300718 | 10/2017 | |

OTHER PUBLICATIONS

Huang et al., "Application of conditional simulation of heterogeneous rock properties to seismic scattering and attenuation analysis in gas hydrate reservoirs." Journal of applied geophysics 77, Feb. 2012, 83-96, 14 pages.

(Continued)

*Primary Examiner* — Mischita L Henson
(74) *Attorney, Agent, or Firm* — Fish & Richardson P.C.

(57) ABSTRACT

Systems and methods develop a three-dimensional model of a subterranean formation based on vertical seismic profiles at a plurality of well locations. This approach can include receiving seismic data for the subterranean formation including the vertical seismic profiles; for each vertical seismic profile, injecting a ground force into the vertical seismic profile to provide a reference trace at depth zero to estimate energy loss in each receiver providing data in the vertical seismic profile and estimating time and depth variant quality factors for the well location associated with the vertical seismic profile based on the seismic profile; estimating quality factors for points within a three-dimensional volume representing the subterranean formation by interpolating between the time and depth variant quality factors for the location associated with each vertical seismic profile; and combining estimated quality factors to generate a three-dimensional quality factor model of the three-dimensional volume representing the subterranean formation.

18 Claims, 7 Drawing Sheets

(56) References Cited

U.S. PATENT DOCUMENTS

| | | |
|---|---|---|
| 7,088,639 B2 | 8/2006 | Wells et al. |
| 7,376,517 B2 | 5/2008 | Rickett |
| 7,555,389 B2 | 6/2009 | Cavalca et al. |
| 2010/0097886 A1 | 4/2010 | Day et al. |
| 2014/0336940 A1* | 11/2014 | Bettinelli ............... G01V 1/282 |
| | | 702/14 |
| 2015/0168573 A1 | 6/2015 | Zhang et al. |
| 2016/0091623 A1 | 3/2016 | Yu et al. |
| 2016/0178772 A1 | 6/2016 | Carter |

OTHER PUBLICATIONS

PCT International Search Report and Written Opinion in International Appln. No. PCT/US2021/022138, dated Jun. 16, 2021, 18 pages.

* cited by examiner

DEVELOPING A THREE-DIMENSIONAL QUALITY FACTOR MODEL OF A SUBTERRANEAN FORMATION BASED ON VERTICAL SEISMIC PROFILES

TECHNICAL FIELD

The present disclosure generally relates to modeling subterranean formations, particularly modeling subterranean formations based on vertical seismic profiles.

BACKGROUND

In geology, sedimentary facies are bodies of sediment that are recognizably distinct from adjacent sediments that resulted from different depositional environments. Generally, geologists distinguish facies by aspects of the rock or sediment being studied. Seismic facies are groups of seismic reflections whose parameters (such as amplitude, continuity, reflection geometry, and frequency) differ from those of adjacent groups. Seismic facies analysis, a subdivision of seismic stratigraphy, plays an important role in hydrocarbon exploration and is one key step in the interpretation of seismic data for reservoir characterization. The seismic facies in a given geological area can provide useful information, particularly about the types of sedimentary deposits and the anticipated lithology.

In reflection seismology, geologists and geophysicists perform seismic surveys to map and interpret sedimentary facies and other geologic features for applications, for example, identification of potential petroleum reservoirs. Seismic surveys are conducted by using a controlled seismic source (for example, a seismic vibrator or dynamite) to create seismic waves. The seismic source is typically located at ground surface. Seismic body waves travel into the ground, are reflected by subsurface formations, and return to the surface where they recorded by sensors called geophones. Seismic surface waves travel along the ground surface and diminish as they get further from the surface. Seismic surface waves travel more slowly than seismic body waves. The geologists and geophysicists analyze the time it takes for the seismic body waves to reflect off subsurface formations and return to the surface to map sedimentary facies and other geologic features. Similarly, analysis of the time it takes seismic surface waves to travel from source to sensor can provide information about near surface features. This analysis can also incorporate data from sources, for example, borehole logging, gravity surveys, and magnetic surveys.

One approach to this analysis is based on tracing and correlating along continuous reflectors throughout the dataset produced by the seismic survey to produce structural maps that reflect the spatial variation in depth of certain facies. These maps can be used to identify impermeable layers and faults that can trap hydrocarbons such as oil and gas.

SUMMARY

This specification describes systems and methods for developing a three-dimensional quality factor (Q) model for a subterranean formation. In seismic modeling and analysis, the quality factor quantifies the energy loss of a propagating wavelet with time due to fluid movement and friction with grain boundary. These systems and methods compensate for the loss of amplitude and frequency from vertical seismic profile (VSP) data in time and depth that can be used for surface seismic compensation. In some cases, the quality factor is estimated using the spectral ratio method from zero offset VSPs using the ground force for each well as its reference trace. These quality factors are populated on the surface seismic in between the wells using geostatistical kriging. The compensation of quality factor helps in providing higher resolution images and better qualitative amplitude versus offset (AVO) analysis of seismic data representing a subterranean formation.

In one aspect, methods for developing a three-dimensional model of a subterranean formation based on vertical seismic profiles at a plurality of well locations include: receiving seismic data for the subterranean formation, the seismic data including the vertical seismic profiles; for each of the vertical seismic profiles, injecting a ground force into the vertical seismic profile to provide a reference trace at depth zero in order to estimate energy loss in each receiver providing data in the vertical seismic profile; for each of the vertical seismic profiles, estimating time and depth variant quality factors for the well location associated with the vertical seismic profile based on the seismic profile; estimating quality factors for points within a three-dimensional volume representing the subterranean formation by interpolating between the time and depth variant quality factors for the location associated with each vertical seismic profile; and combining the estimated quality factors to generate a three-dimensional quality factor model of the three-dimensional volume representing the subterranean formation.

In one aspect, systems for developing a three-dimensional model of a subterranean formation based on vertical seismic profiles at a plurality of well locations, the system can include: one or more processing devices and one or more non-transitory machine-readable storage devices storing instructions that are executable by the one or more processing devices to cause performance of operations including: receiving seismic data for the subterranean formation, the seismic data including the vertical seismic profiles; for each of the vertical seismic profiles, injecting a ground force into the vertical seismic profile to provide a reference trace at depth zero in order to estimate energy loss in each receiver providing data in the vertical seismic profile; for each of the vertical seismic profiles, estimating time and depth variant quality factors for the well location associated with the vertical seismic profile based on the seismic profile; estimating quality factors for points within a three-dimensional volume representing the subterranean formation by interpolating between the time and depth variant quality factors for the location associated with each vertical seismic profile; and combining the estimated quality factors to generate a three-dimensional quality factor model of the three-dimensional volume representing the subterranean formation.

Embodiments of the systems and methods can include one or more of the following features.

Some embodiments also include applying the three-dimensional quality factor model to surface seismic data to adjust the surface seismic data to compensate for loss of energy in the surface seismic data. In some cases, systems and methods also include performing amplitude versus offset analysis using the adjusted surface seismic data.

In some embodiments, the interpolating comprises geostatistical kriging. In some cases, the interpolating further comprises co-kriging with seismic attributes including dip-velocity and coherency.

Some embodiments also include defining a continuous surface seismic attribute that has a positive correlation with the estimated quality factors at the well locations. In some cases, defining a continuous surface seismic attribute that has a positive correlation with the estimated quality factors at the well locations comprises cross plotting the estimated quality factors at the well location with different surface seismic attributes. In some cases, systems and methods also include selecting one of the different surface seismic attributes to use as secondary data for co-kriging.

Some embodiments also include cross-correlating a seismic trace corresponding to the vertical seismic profiles at multiple well locations with full surface seismic data for the subterranean formation to estimate a background quality factor model. In some cases, systems and methods also include using the background quality factor model as secondary data for co-kriging.

In some embodiments, estimating time and depth variant quality factors for the well location associated with the vertical seismic profile based on the seismic profile comprises using a spectral ratio method and compensating for inelastic attenuation associated with the geology and fluid content of the subterranean formation at the well location associated with the vertical seismic profile.

Some embodiments also include cross-correlating the time and depth variant quality factors for the well location with well logs and seismic amplitude data associated with the well location.

These systems and methods can provide amplitude vs offset models to be used for reservoir description and lithofacies clustering that are better than previous quality factor estimation approaches. This approach compensates for the generally poor quality of near-surface data in existing VSP surveys and logs by introducing a new reference trace at the surface. This approach can provide high frequency time and depth subsurface images with improved resolution; derivation of attenuation in wells for which VSPs are available; improved acoustic impedance inversion for AVO analysis; and reduced uncertainty in depth estimation.

In some implementations, these systems and methods include generating a three-dimensional quality factor volume by kriging location-specific quality factors based on vertical seismic profiles. This approach has not been used for quality factor generation because of the high data requirements of kriging are generally incompatible with the typical low availability of vertical seismic profiles.

The details of one or more embodiments of these systems and methods are set forth in the accompanying drawings and the description to be presented. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes systems and methods for developing a three-dimensional quality factor model for a subterranean formation. In seismic modeling and analysis, the quality factor quantifies the energy loss of a propagating wavelet with time due to fluid movement and friction with grain boundary. These systems and methods compensate for the loss of amplitude and frequency from vertical seismic profile data in time and depth that can be used for surface seismic compensation. In this approach, the quality factor is estimated using the spectral ratio method from zero offset VSPs using the ground force for each well as its reference trace. These quality factors are populated on the surface seismic in between the wells using geostatistical kriging. The compensation of quality factor helps in providing higher resolution images and better qualitative amplitude versus offset (AVO) analysis of seismic data representing a subterranean formation.

Figure 1:
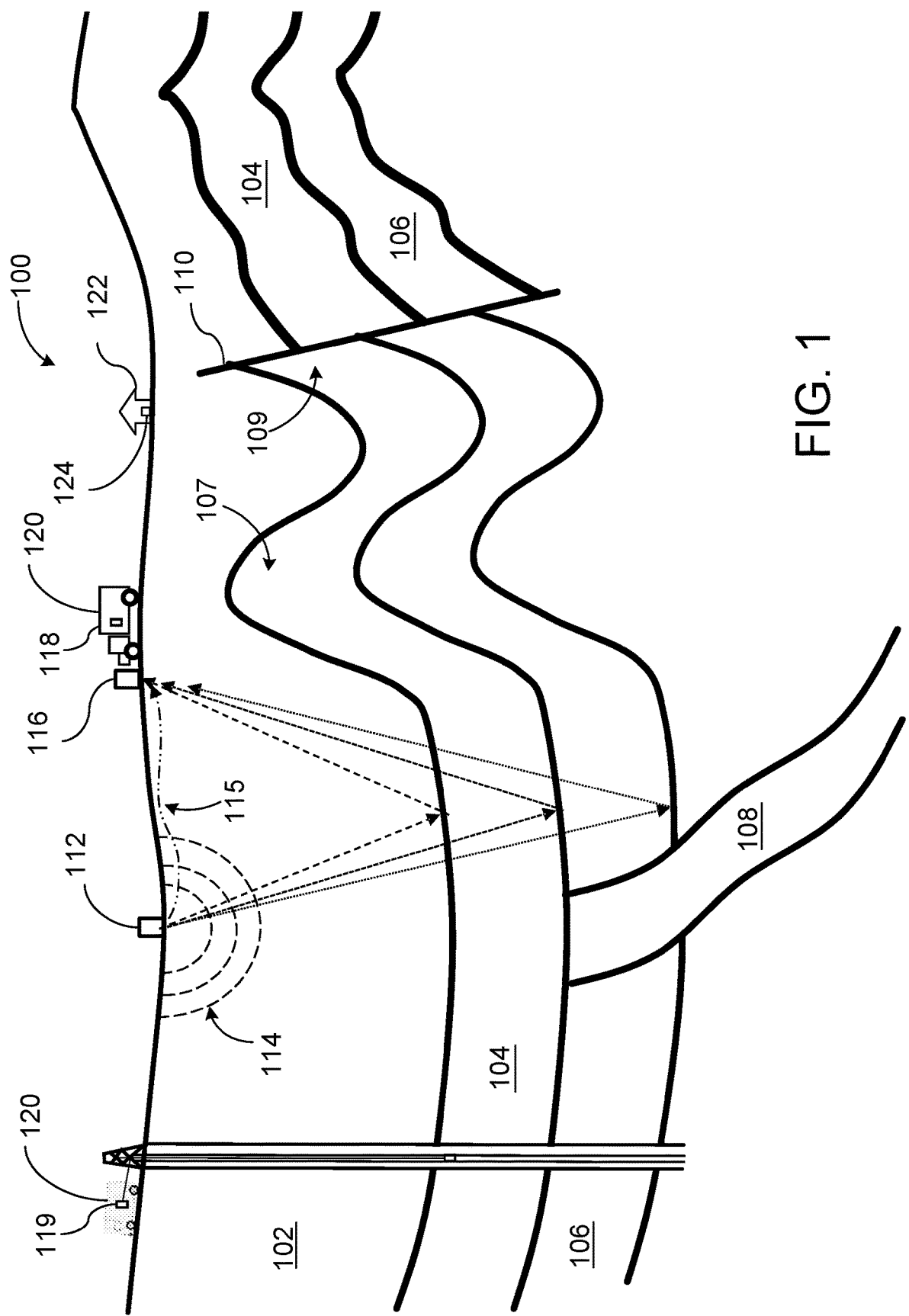
FIG. 1 is a schematic view of a seismic survey being performed to map subterranean features such as facies and faults.

FIG. 1 is a schematic view of a seismic survey being performed to map subterranean features such as facies and faults in a subterranean formation 100. The subterranean formation 100 includes a layer of impermeable cap rock 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow in with clay material between the walls traps the petroleum. Other traps include salt domes and stratigraphic traps.

A seismic source 112 (for example, a seismic vibrator or an explosion) generates seismic waves that propagate in the earth. Although illustrated as a single component in FIG. 1, the source or sources 112 are typically a line or an array of sources 112. The generated seismic waves include seismic body waves 114 that travel into the ground and seismic surface waves 115 travel along the ground surface and diminish as they get further from the surface. The generated seismic signal at the source is typically located at the ground surface and is sometimes referred to as the ground force.

The velocity of these seismic waves depends properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic body waves 114 contact interfaces between geologic bodies or layers that have different velocities, each interface reflects some of the energy of the seismic wave and refracts some of the energy of the seismic wave. Such interfaces are sometimes referred to as horizons.

The seismic body waves 114 are received by a sensor or sensors 116. Although illustrated as a single component in FIG. 1, the sensor or sensors 116 are typically a line or an array of sensors 116 that generate an output signal in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

The seismic surface waves 115 travel more slowly than seismic body waves 114. Analysis of the time it takes seismic surface waves 115 to travel from source to sensor can provide information about near surface features.

In some situations, seismic surveys include vertical seismic profiles, a technique of seismic measurements used for correlation with surface seismic data. In a vertical seismic profile, either the energy source, the detectors, or both are in a wellbore. For example, sensors in a well borehole record reflected seismic energy originating from a seismic source at the surface. There are numerous methods for acquiring a vertical seismic profile (VSP). For example, zero-offset VSPs have sources close to the wellbore directly above the sensors; offset VSPs have sources some distance from sensors in a wellbore; and walkaway VSPs feature a source that is moved progressively farther offset from sensors in a fixed location.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer systems 124 may be displayed for user viewing using local or remote monitors or other display units. One approach to analyzing seismic data is to associate the data with portions of a seismic cube representing represent the subterranean formation 100. The seismic cube can also be display results of the analysis of the seismic data associated with the seismic survey.

Figure 2:
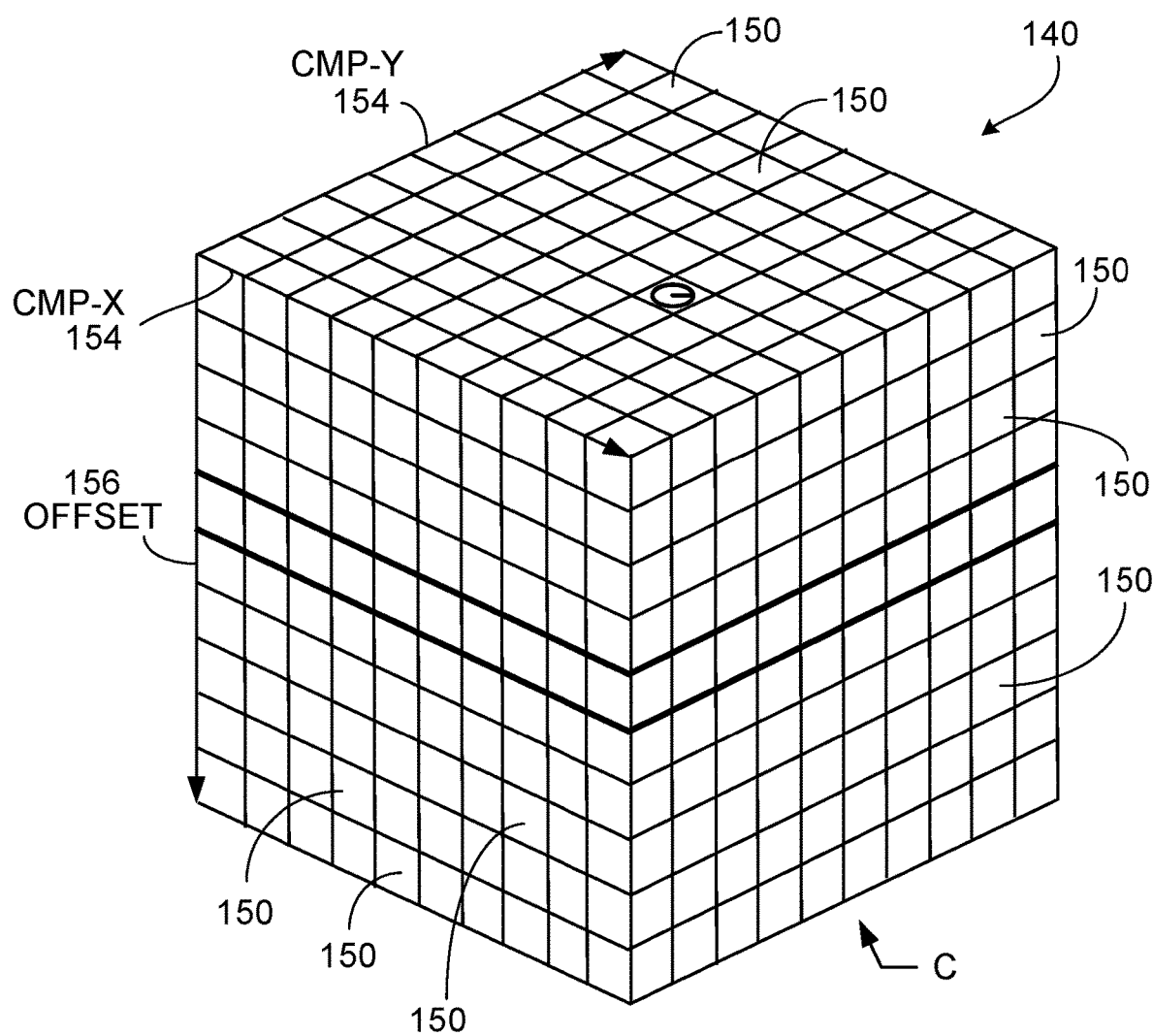
FIG. 2 illustrates a three-dimensional representation of the subterranean region where the seismic survey was performed.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and an offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
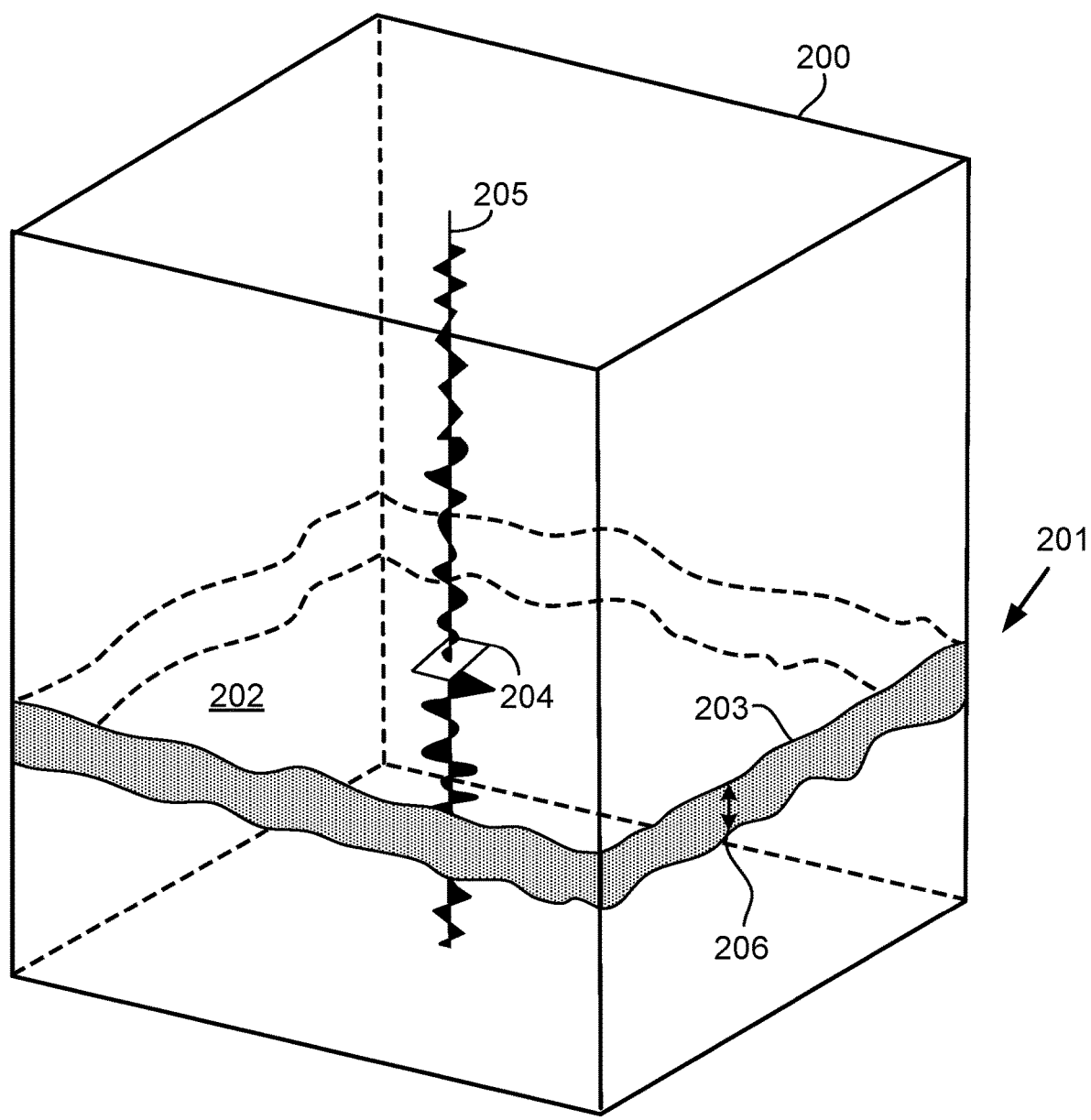
FIG. 3 illustrates a stratigraphic trace within a formation.

FIG. 3 illustrates a seismic cube 200 representing a formation. Although the illustrated three-dimensional volume is represented as a cube, subterranean formations can also be represented points arranged in configurations other than cubes. The seismic cube has a stratum 201 based on a surface (for example, an amplitude surface 202) and a stratigraphic horizon 203. The amplitude surface 202 and the stratigraphic horizon 203 are grids that include many cells such as exemplary cell 204. Each cell is a sample of a seismic trace representing an acoustic wave. Each seismic trace has an x-coordinate and a y-coordinate, and each data point of the trace corresponds to a certain seismic travel time or depth (t or z). For the stratigraphic horizon 203, a time value is determined and then assigned to the cells from the stratum 201. For the amplitude surface 202, the amplitude value of the seismic trace at the time of the corresponding horizon is assigned to the cell. This assignment process is repeated for all of the cells on this horizon to generate the amplitude surface 202 for the stratum 201. In some instances, the amplitude values of the seismic trace 205 within window 206 by horizon 203 are combined to generate a compound amplitude value for stratum 201. In these instances, the compound amplitude value can be the arithmetic mean of the positive amplitudes within the duration of the window, multiplied by the number of seismic samples in the window. This specification discusses applications in which the three-dimensional volume (e.g., cube) includes a quality factor that quantifies the energy loss of a propagating wavelet with time due to fluid movement and friction with grain boundaries in the subterranean formation rather than an amplitude surface. Such as three-dimensional quality factor model can be used to adjust and refine an amplitude surface based representation of the subterranean formation.

Figure 4C:
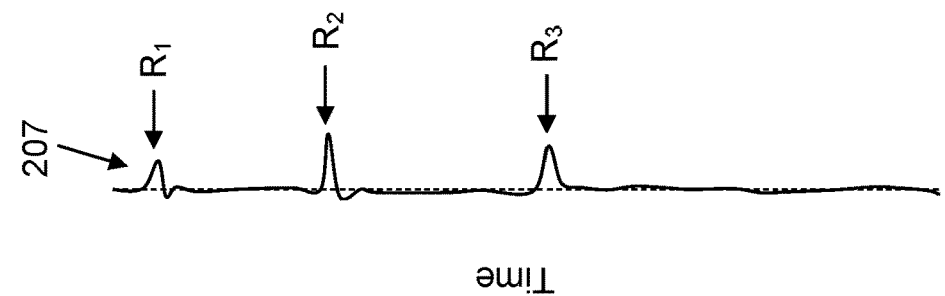
FIGS. 4A, 4B, and 4C schematically illustrate the process stacking a group of seismic traces to improve the signal to noise ratio of the traces.
Figure 4B:
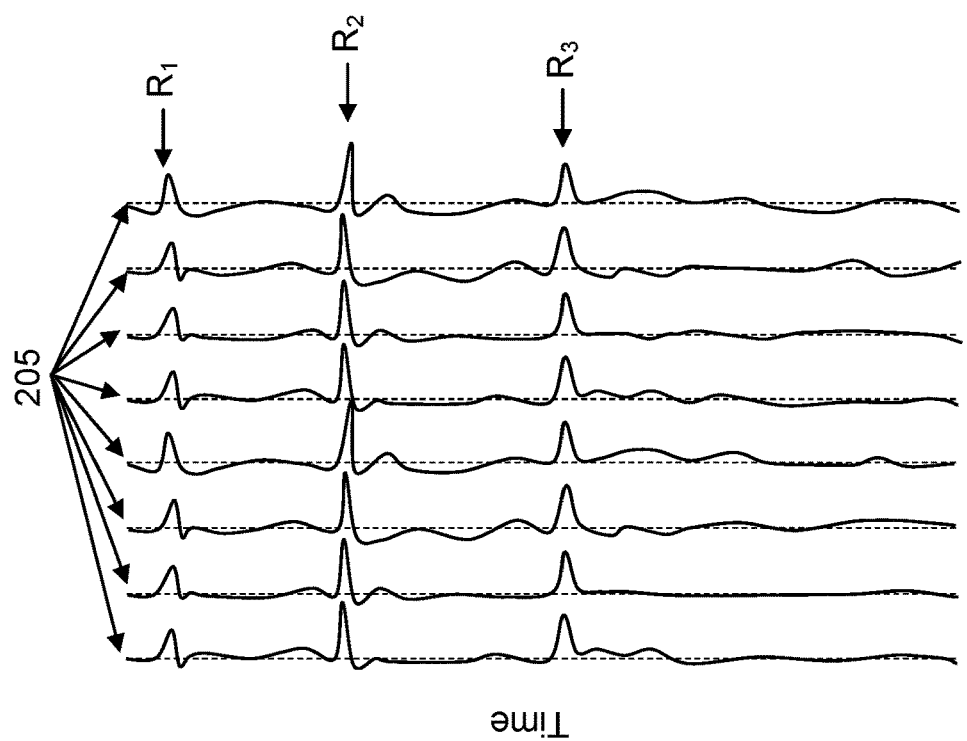
Figure 4A:
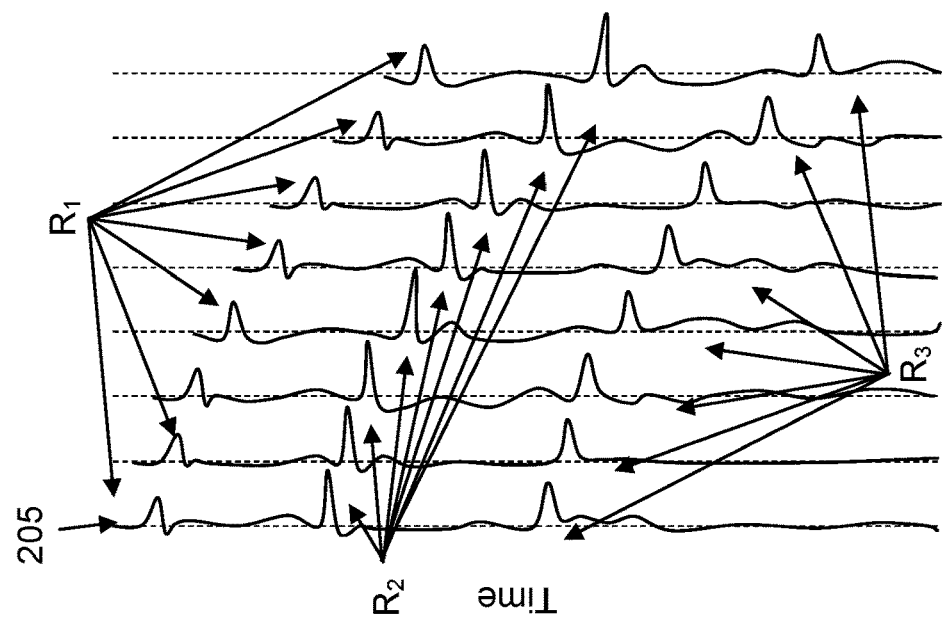

[FIGS. 4A, 4B, and 4C schematically illustrate the process stacking a group of seismic traces 205 to improve the signal to noise ratio of the traces. FIG. 4A illustrates a common midpoint (CMP) gather of eight traces 205 generated by a set of sources and sensors that share a common midpoint. For ease of explanation, the traces are assumed to have been generated by reflections from three horizontal horizons.

The traces 205 are arranged with increasing offset from the CMP. The offset of the traces 205 from the CMP increase from left to right and the reflection time increases from top to bottom. Increasing offset from the common midpoint increases the angle of a seismic wave that between a source and a sensor, increases the distance the wave travels between the source and the sensor, and increases the slant reflection time. The increasing time for the reflections ($R_1$, $R_2$, $R_3$) from each of the horizons to arrive for source-sensor pairs with increasing offsets from the CMP reflects this increased slant time.

FIG. 4B shows the traces 205 after normal moveout (NMO) correction. NMO is the difference between vertical reflection time and the slant reflection time for a given source-sensor pair. This correction places reflections ($R_1$, $R_2$, $R_3$) from common horizons at the same arrival time. The NMO correction is a function of the vertical reflection time for a specific horizon, the offset of a specific source-sensor pair, and the velocity of the seismic wave in the subterranean formation. The vertical reflection time for a specific horizon and the offset for a specific source-sensor pair are known parameters for each trace. However, the velocity is usually not readily available. As previously discussed, the velocity of seismic waves depends properties, for example, density, porosity, and fluid content of the medium through which the seismic waves are traveling and consequently varies with location in the subterranean formation being studied.

FIG. 4C shows a stack trace 207 generated by summing the traces 205 of the CMP gather and dividing the resulting amplitudes by the number of traces in the gather. The number of traces in the gather is also referred to as the fold of the gather. The noise tends to cancel out and the reflections ($R_1$, $R_2$, $R_3$) from the horizons of the subterranean formation are enhanced.

This specification discusses applications in which the ground force of the seismic source is injected into the VSP record to provide a reference trace at depth zero as if on the surface, in order to estimate energy loss in the each receiver in the well/hole. For most VSPs, the shallowest traces are of bad quality due to the presence of multiple casing strings and cannot be used as a reference trace for attenuation. The ground force is used as a replacement for these bad traces in the shallow part of the VSP.

Figure 5:
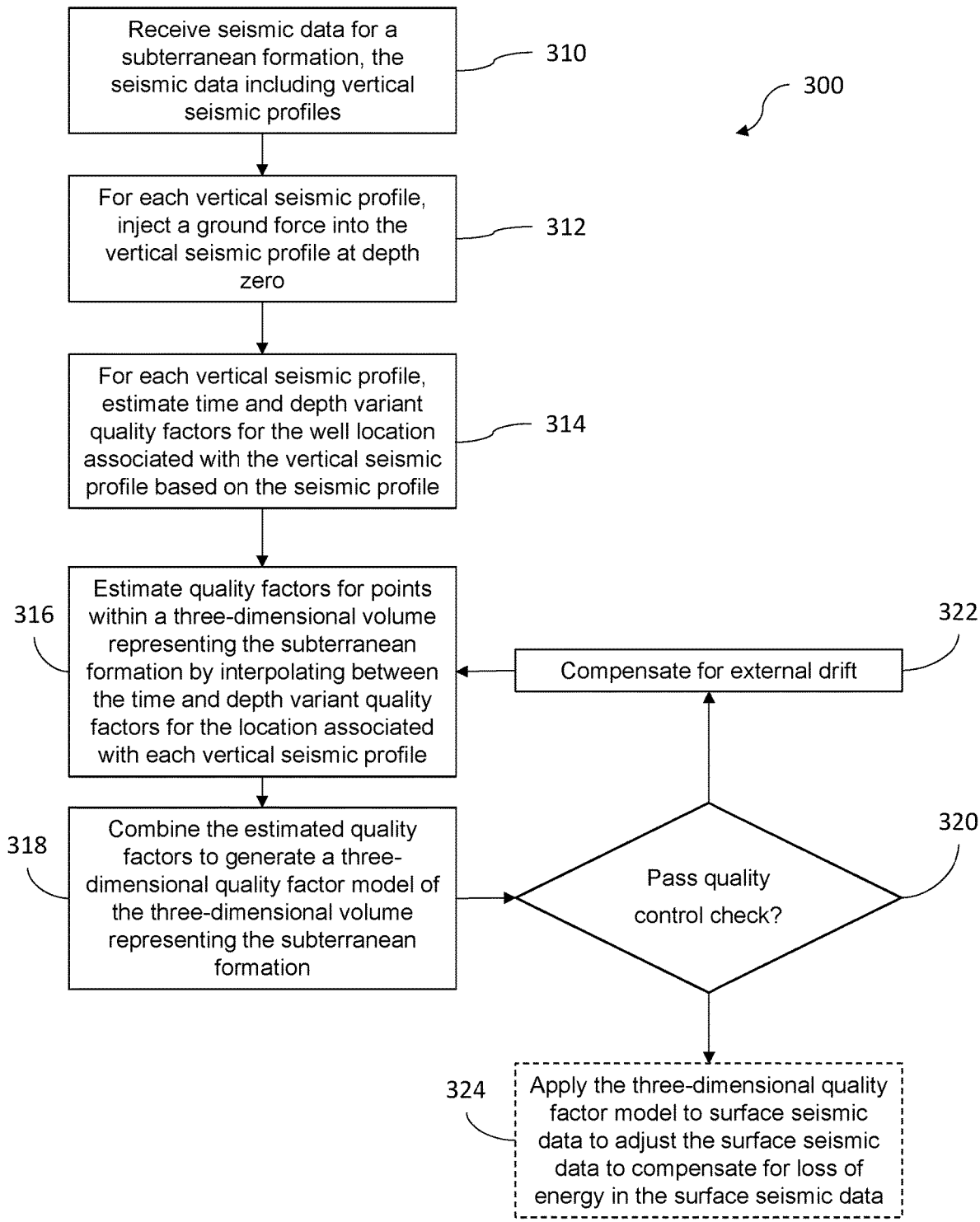
FIG. 5 is a flow diagram of an example process for developing a three-dimensional quality factor model for a subterranean formation.
Figure 6:
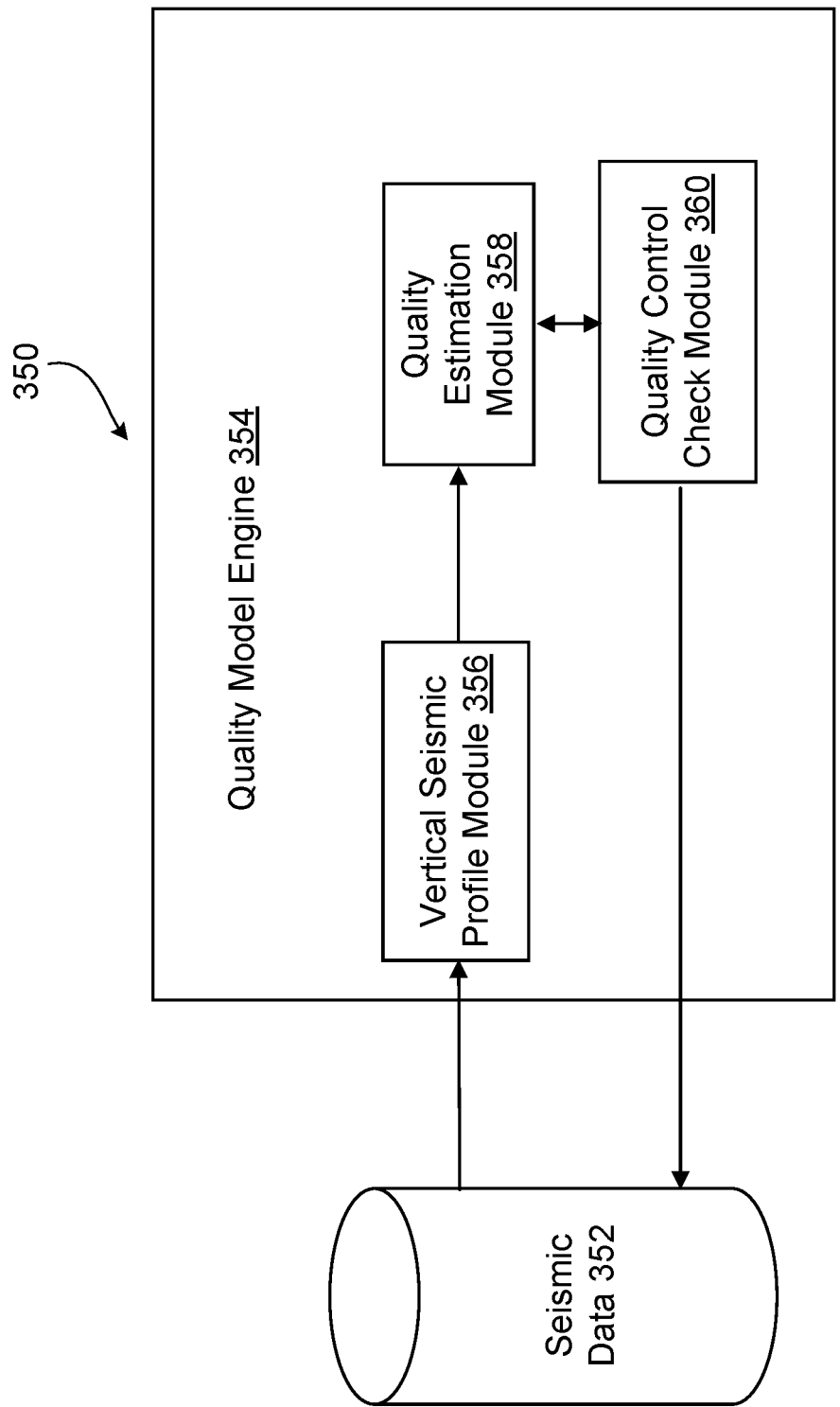
FIG. 6 is a block diagram of an example system implementing the process of FIG. 5.

FIG. 5 illustrates a method 300 for developing a three-dimensional quality factor model for a subterranean formation. FIG. 6 illustrates a system 350 that can be used to perform the method 300. The method 300 is described below with reference to the system 350 but can also be performed on other systems.

As previously discussed, the quality factor quantifies the energy loss of a propagating wavelet with time due to fluid movement and friction with grain boundary. The method 300 can compensate for the loss of amplitude and frequency from vertical seismic profile data in time and depth that can be used for surface seismic compensation. In this approach, the quality factor is estimated using the spectral ratio method from zero offset VSPs using the ground force for each well as its reference trace. The spectral ratio method worked best in tests on viscoelastic synthetics. Estimated Q from the synthetics using the spectral ratio method gave better results than Q estimated using the peak frequency shift method. The spectral ratio method worked well in the study area used for testing and is practical and user friendly method for this purpose. However, other methods for estimating Q can also be used in some circumstances. These quality factors are populated on the surface seismic representation in between the wells using geostatistical kriging. The compensation of quality factor helps in providing higher resolution images and better qualitative amplitude versus offset (AVO) analysis of seismic data representing a subterranean formation. After generating a three-dimensional quality factor volume that is derived from wells' VSP data, the three-dimensional quality factor volume can be integrated with other seismic data processing steps to produce amplitude friendly data with greater resolution.

In the method 300, seismic data for the subterranean formation is received (310). The seismic data includes the vertical seismic profiles. For example, a quality model engine 354 can receive information from the seismic data database 352.

For each of the vertical seismic profiles, a ground force is injected into the vertical seismic profile to provide a reference trace at depth zero in order to estimate energy loss in each receiver providing data in the vertical seismic profile (312) by the vertical seismic profile module 356.

A quality estimation module 358 of the quality model engine 350 receives the profiles from the vertical seismic profile module 356. Time and depth variant quality factors for the well location associated with the vertical seismic profile are estimated based on the seismic profile (314) by the quality estimation module 358. For example, the time and depth variant quality factors can be derived from zero offset vertical seismic profiles using the ground force as the reference trace. This approach is particularly useful in fields where acquiring zero-offset VSPs in order to obtain time-depth relationships is part of routine operations. Since conventional surface seismic data is in time and drilling is in depth, ZVSP is the link between time and depth. Using the ground force as the reference trace is particularly helpful for zero offset vertical seismic profiles because zero offset vertical seismic profiles typically do not have good near-surface data.

In some cases, estimating time and depth variant quality factors for the well location associated with the vertical seismic profile based on the seismic profile can include using a spectral ratio method and compensating for inelastic attenuation associated with the geology and fluid content of the subterranean formation at the well location associated with the vertical seismic profile. The method can also include cross-correlating the time and depth variant quality factors for the well location with well logs and seismic amplitude data associated with the well location.

After time and depth variant quality factors for the well location associated with the vertical seismic profile is estimated, interpolating between the time and depth variant quality factors for the location associated with each vertical seismic profile is used to estimate quality factors for points within a three-dimensional volume representing the subterranean formation (316). This step can be performed by the quality estimation module 358. The interpolation can include geostatistical kriging. wherein the interpolating further comprises co-kriging with seismic attributes including dip-velocity and coherency. Only the vertical component of the zero-offset vertical seismic profile are used in estimating Q values, since the focus is on P-wave data and the applications in surface seismic are P-wave reflections.

This method requires horizon interpretations to honor estimated changes of interval quality factors at the well locations, and guide its lateral population. This approach assumes a spatial dependency between quality factors at separate points in an area. This assumption is valid since the quality factor is geologically dependent on the lithology of the subterranean formation and the closer two locations are, the more geologically related they are. Quality control is important because inaccurately estimated quality factors significantly affect the geostatistical kriging used for interpolation. To avoid these anomalies, the quality factor is checked and tied to geology before kriging. In cases where values of quality factor are greater than 1000, quality factor values above 700 are treated as an infinite quality factor and the data is clipped to 700 as maximum value. As the quality factor is the reciprocal of attenuation, small values of Q represent high attenuation and vice versa. Although 700 was used as a cutoff in tests of the system to reflect data where the attenuation is negligible, this step is optional and, if included, other values can be used as a cutoff.

The estimated quality factors are combined to generate a three-dimensional quality factor model of the three-dimensional volume representing the subterranean formation (318). A quality control check is then performed on the three-dimensional quality factor model (320) by the quality control module 360. For example, the quality check can involve checking the correlation of Q values estimated from VSP against logs and seismic velocities based on the reasonable assumption that the Q factor is geologically (lithology) dependent and thus, the closer two locations are to each other the more geologically related the two locations are. Checking the correlation can be performed, for example, by plotting the data on a semi-variogram. If the three-dimensional quality factor model passes the quality control check, the three-dimensional quality factor model is ready for use. If the three-dimensional quality factor model fails the quality control check, the process can be iterated after compensating for external drift (322).

For example, co-kriging can be performed to compensate for external drift. One approach includes defining a continuous surface seismic attribute that has a positive correlation with the estimated quality factors at the well locations. In some cases, defining a continuous surface seismic attribute that has a positive correlation with the estimated quality factors at the well locations comprises cross plotting the estimated quality factors at the well location with different surface seismic attributes (e.g., seismic velocities, coherency, RMS of seismic amplitudes, and/or seismic envelope). One of the different surface seismic attributes can selected to use as secondary data for the co-kriging. For example, after defining a continuous surface seismic attribute, it can be cross-plotted against the estimated Q values at well locations. Cross-plotting the estimated Q values at the well location with different surface seismic attribute will give an indication of which attribute can be used as secondary data for co-kriging. Appropriate attributes will exhibit a strong positive correlation factor (e.g., a linear fit of above 0.65-0.70). In some cases, a seismic trace corresponding to the vertical seismic profiles at multiple well locations can be cross-correlated with full surface seismic data for the subterranean formation to estimate a background quality factor model. The background quality factor model can be used as secondary data for co-kriging.

In use, the three-dimensional quality factor model can be applied to surface seismic data to adjust the surface seismic data to compensate for loss of energy in the surface seismic data. The adjusted surface seismic data can be used, for example, to perform better amplitude versus offset analysis of formations such as geologically thin rock formations.

Figure 7:
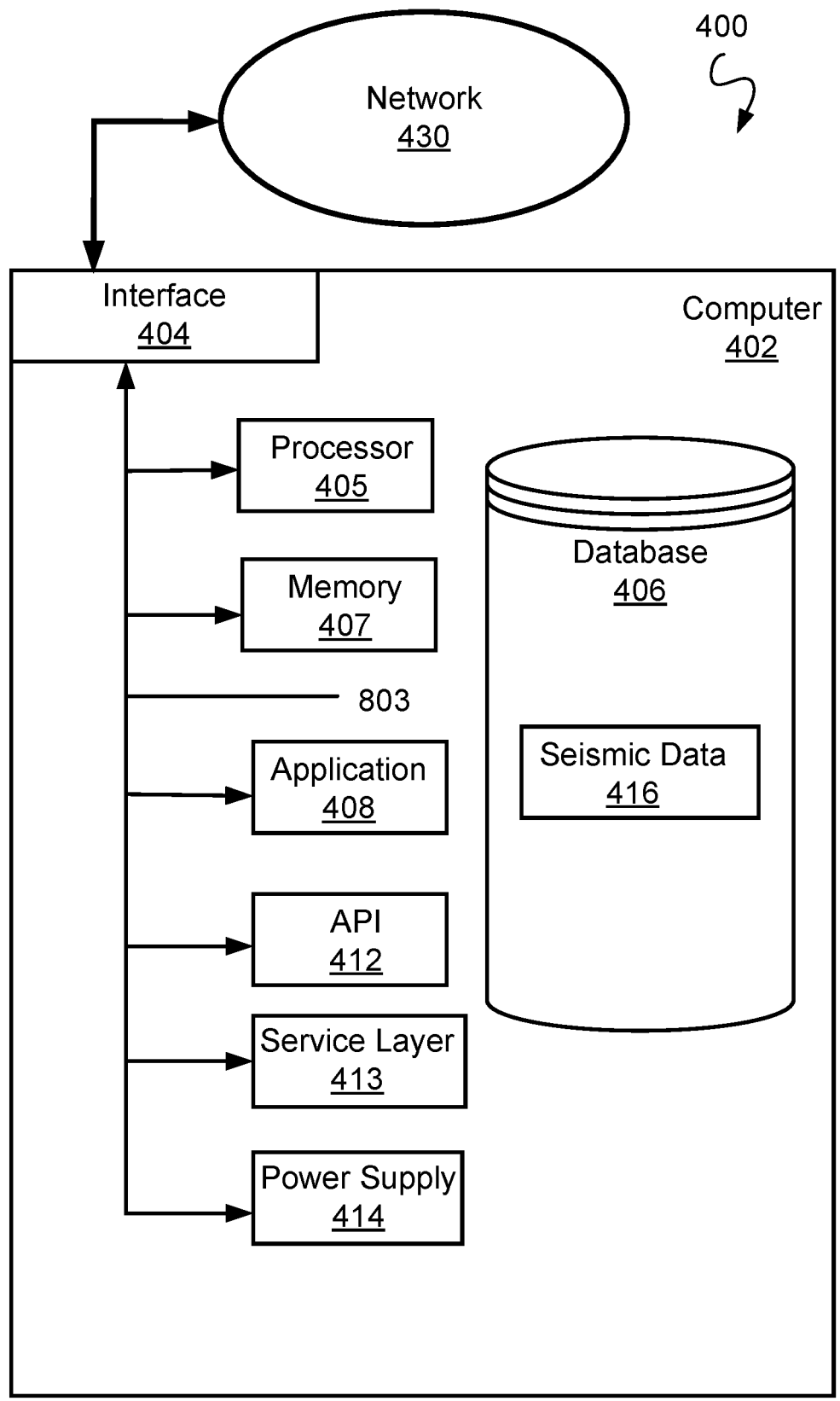
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both), over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the hardware of the interface can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data (for example, seismic data 416) for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for developing a three-dimensional model of a subterranean formation based on zero offset vertical seismic profiles at a plurality of well locations, the method comprising:
   receiving seismic data for the subterranean formation, the seismic data including the zero offset vertical seismic profiles;
   for each of the zero offset vertical seismic profiles, injecting a ground force into the zero offset vertical seismic profile to provide a reference trace at depth zero in order to estimate energy loss in each receiver providing data in the zero offset vertical seismic profile;
   for each of the zero offset vertical seismic profiles, estimating time and depth variant quality factors for the well location associated with the zero offset vertical seismic profile based on the seismic profile;
   estimating quality factors for points within a three-dimensional volume representing the subterranean formation by interpolating between the time and depth variant quality factors for the location associated with each zero offset vertical seismic profile; and
   combining the estimated quality factors to generate a three-dimensional quality factor model of the three-dimensional volume representing the subterranean formation.

2. The method of claim 1, further comprising applying the three-dimensional quality factor model to surface seismic data to adjust the surface seismic data to compensate for loss of energy in the surface seismic data.

3. The method of claim 2, further comprising, performing amplitude versus offset analysis using the adjusted surface seismic data.

4. The method of claim 1, wherein the interpolating comprises geostatistical kriging.

5. The method of claim 4, wherein the interpolating further comprises co-kriging with seismic attributes including dip-velocity and coherency.

6. The method of claim 1, further comprising defining a continuous surface seismic attribute that has a positive correlation with the estimated quality factors at the well locations.

7. The method of claim 6, wherein defining a continuous surface seismic attribute that has a positive correlation with the estimated quality factors at the well locations comprises cross plotting the estimated quality factors at the well location with different surface seismic attributes.

8. The method of claim 7, further comprising selecting one of the different surface seismic attributes to use as secondary data for co-kriging.

9. The method of claim 1, further comprising cross-correlating a seismic trace corresponding to the zero offset vertical seismic profiles at multiple well locations with full surface seismic data for the subterranean formation to estimate a background quality factor model.

10. The method of claim 9, further comprising using the background quality factor model as secondary data for co-kriging.

11. The method of claim 1, further comprising cross-correlating the time and depth variant quality factors for the well location with well logs and seismic amplitude data associated with the well location.

12. A system for developing a three-dimensional model of a subterranean formation based on zero offset vertical seismic profiles at a plurality of well locations, the system comprising:
  one or more processing devices and one or more non-transitory machine-readable storage devices storing instructions that are executable by the one or more processing devices to cause performance of operations comprising:
    receiving seismic data for the subterranean formation, the seismic data including the zero offset vertical seismic profiles;
    for each of the zero offset vertical seismic profiles, injecting a ground force into the zero offset vertical seismic profile to provide a reference trace at depth zero in order to estimate energy loss in each receiver providing data in the zero offset vertical seismic profile;
    for each of the zero offset vertical seismic profiles, estimating time and depth variant quality factors for the well location associated with the zero offset vertical seismic profile based on the zero offset vertical seismic profile;
    estimating quality factors for points within a three-dimensional volume representing the subterranean formation by interpolating between the time and depth variant quality factors for the location associated with each zero offset vertical seismic profile; and
    combining the estimated quality factors to generate a three-dimensional quality factor model of the three-dimensional volume representing the subterranean formation.

13. The system of claim 12, wherein the operations further comprise applying the three-dimensional quality factor model to surface seismic data to adjust the surface seismic data to compensate for loss of energy in the surface seismic data.

14. The system of claim 13, wherein the operations further comprise performing amplitude versus offset analysis using the adjusted surface seismic data.

15. The system of claim 12, wherein the interpolating comprises co-kriging with seismic attributes including dip-velocity and coherency.

16. The system of claim 12, wherein the operations further comprise defining a continuous surface seismic attribute that has a positive correlation with the estimated quality factors at the well locations.

17. The system of claim 16, wherein defining a continuous surface seismic attribute that has a positive correlation with the estimated quality factors at the well locations comprises cross plotting the estimated quality factors at the well location with different surface seismic attributes and further comprising selecting one of the different surface seismic attributes to use as secondary data for co-kriging.

18. The system of claim 12, wherein the operations further comprise:
  cross-correlating a seismic trace corresponding to the zero offset vertical seismic profiles at multiple well locations with full surface seismic data for the subterranean formation to estimate a background quality factor model; and
  using the background quality factor model as secondary data for co-kriging.

* * * * *